United States Patent
Shibata

(10) Patent No.: US 10,374,735 B2
(45) Date of Patent: Aug. 6, 2019

(54) COMMUNICATION SYSTEM, COMMUNICATION SYSTEM CONTROL METHOD, TRANSMISSION DEVICE, AND RECEPTION DEVICE

(71) Applicant: NEC Corporation, Tokyo (JP)

(72) Inventor: Kazuki Shibata, Tokyo (JP)

(73) Assignee: NEC Corporation, Tokyo (JP)

( * ) Notice: Subject to any disclaimer, the term of this patent is extended or adjusted under 35 U.S.C. 154(b) by 461 days.

(21) Appl. No.: 14/898,990

(22) PCT Filed: May 19, 2014

(86) PCT No.: PCT/JP2014/002612
§ 371 (c)(1),
(2) Date: Dec. 16, 2015

(87) PCT Pub. No.: WO2014/203449
PCT Pub. Date: Dec. 24, 2014

(65) Prior Publication Data
US 2016/0134387 A1    May 12, 2016

(30) Foreign Application Priority Data
Jun. 18, 2013 (JP) .................................. 2013-127405

(51) Int. Cl.
*H04J 3/06* (2006.01)
(52) U.S. Cl.
CPC .......... *H04J 3/0667* (2013.01); *H04J 3/0673* (2013.01)
(58) Field of Classification Search
CPC ....................................................... H04J 3/06
(Continued)

(56) References Cited

U.S. PATENT DOCUMENTS

| 5,815,819 A * | 9/1998 | Ohta | H04W 52/029 455/574 |
| 2006/0026388 A1 * | 2/2006 | Karp | G06F 9/3834 712/24 |

(Continued)

FOREIGN PATENT DOCUMENTS

| JP | 2007-184687 | 7/2007 |
| JP | 2010-213101 | 9/2010 |

(Continued)

OTHER PUBLICATIONS

International Search Report dated Aug. 19, 2014 in corresponding PCT International Application.

*Primary Examiner* — Derrick W Ferris
*Assistant Examiner* — Abdeltif Ajid
(74) *Attorney, Agent, or Firm* — Finnegan, Henderson, Farabow, Garrett & Dunner, L.L.P.

(57) ABSTRACT

A counter is synchronized with a counter within a communication device and measures, as a first count value, a timing before a PTP packet is input to a processing unit that performs processing on the PTP packet. A multiplexing unit multiplexes the first count value into the PTP packet. The counter measures, as a second count value, a timing when processing by a processing unit that performs processing on the PTP packet is completed. A count extraction unit extracts the first count value from the PTP packet. A modification unit modifies a correction field by calculating a modification value based on the second count value, the first count value, and a value of the correction field within the PTP packet, the value of the correction field indicating a total amount of delay in a relay device.

17 Claims, 8 Drawing Sheets

(58) Field of Classification Search
USPC .......................................................... 370/503
See application file for complete search history.

(56) References Cited

U.S. PATENT DOCUMENTS

| | | | | |
|---|---|---|---|---|
| 2008/0100364 | A1* | 5/2008 | Hiraku | H03K 5/15013 327/245 |
| 2012/0106576 | A1* | 5/2012 | Hadzic | H04J 3/0697 370/503 |
| 2013/0028265 | A1 | 1/2013 | Ronchetti et al. | |
| 2013/0272352 | A1 | 10/2013 | Kamada | |

FOREIGN PATENT DOCUMENTS

| | | |
|---|---|---|
| WO | WO 2011/131556 A1 | 10/2011 |
| WO | WO 2012/086372 A1 | 6/2012 |

* cited by examiner

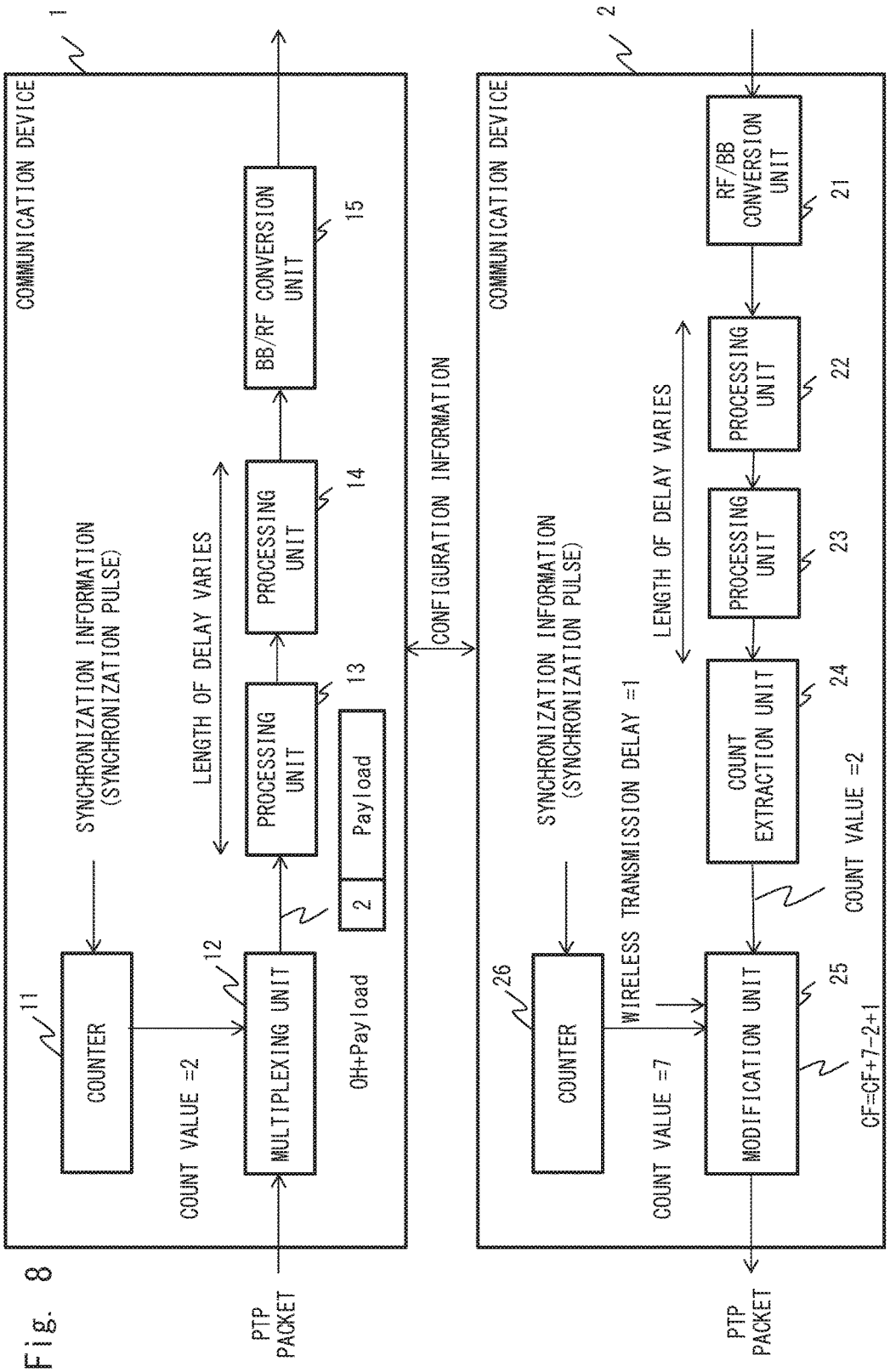

COMMUNICATION SYSTEM, COMMUNICATION SYSTEM CONTROL METHOD, TRANSMISSION DEVICE, AND RECEPTION DEVICE

CROSS-REFERENCE TO RELATED PATENT APPLICATIONS

This application is a National Stage Entry of International Application No. PCT/JP2014/002612, filed May 19, 2014, which claims priority from Japanese Patent Application No. 2013-127405, filed Jun. 18, 2013. The entire contents of the above-referenced applications are expressly incorporated herein by reference.

TECHNICAL FIELD

The present invention relates to a communication system, a communication system control method, a transmission device, and a reception device. In particular, the present invention relates to a communication system, a communication system control method, a transmission device, and a reception device which perform time synchronization between communication devices.

BACKGROUND ART

In recent years, a technique for performing time synchronization between communication devices has attracted attention. An example of a technical specification for this time synchronization technique is IEEE (Institute of Electrical and Electronic Engineers) 1588. The IEEE 1588 defines PTP (Precision Time Protocol). This PTP is a protocol for accurate time synchronization between communication devices within a network.

An outline of a time synchronization process using the PTP will be described below. In the time synchronization, a propagation delay time between a master node and a slave node is measured and time information within each device is corrected based on the propagation delay time, thereby achieving accurate time synchronization.

First, the master node transmits a Sync message. At this time, the master node holds a time t1 when the Sync message is transmitted. The slave node holds a time t2 when the Sync message is received. The master node inserts information about the time t1 into a Follow_Up message, and transmits the Follow_Up message. The slave node receives the Follow_Up message to thereby obtain the information about the time t1. Subsequently, the slave node transmits a Delay_Req message at a time t3. The master node inserts, into a Delay_Resp message, information about a time t4 when the Delay_Req message is received, and transmits the Delay_Resp message to the slave node. The slave node receives the Delay_Resp message to thereby recognize the times t1 to t4. A propagation delay time can be calculated by the formula $((t2-t1)+(t4-t3))/2$. The slave node corrects the time of the slave node using the propagation delay time, thereby performing time synchronization between the slave node and the master node.

In this case, relay devices are generally present on a path between the master node and a client node. Each relay device measures a processing delay time within the relay device, and sets the processing delay time in a correction field within each synchronization message (e.g., Follow_Up message). The term "correction field" refers to a field (delay amount field) in which a total time during which the synchronization message remains in nodes (e.g., relay devices) other than the master node and the slave node (i.e., a total delay time in all devices except the master node and the slave node) is set.

In general, each relay device modifies the correction field every time processing in an internal processing unit in which a delay occurs is completed. Patent Literature 1 discloses one mode of time control using a TSF (Timing Synchronization Function) timer.

CITATION LIST

Patent Literature

[Patent Literature 1] Japanese Unexamined Patent Application Publication No. 2007-184687

SUMMARY OF INVENTION

Technical Problem

As described above, a general relay device modifies the correction field every time processing in an internal processing unit is completed. However, when there are a plurality of internal processing units in which a delay occurs, it is necessary to provide a configuration for modifying the correction field every time processing in the internal processing units is completed. That is, there is a problem that the internal configuration of each relay device is complicated.

The present invention has been made in view of the above-mentioned problem, and a principal object of the present invention is to provide a communication system, a communication system control method, a transmission device, and a reception device which are capable of modifying a delay field with a simple configuration.

Solution to Problem

An exemplary aspect of a communication system according to the present invention is a communication system including: a transmission device that transmits a time synchronization packet for time synchronization between opposing devices; and a reception device that receives the time synchronization packet. The transmission device includes: a first counter that is synchronized with a second counter within the reception device, and measures, as a first count value, a timing before the time synchronization packet is input to a processing unit that performs processing on the time synchronization packet; and a multiplexing unit that multiplexes the first count value into the time synchronization packet. The reception device includes: the second counter that measures, as a second count value, a timing when processing by a processing unit that performs processing on the time synchronization packet is completed; a count extraction unit that extracts the first count value from the time synchronization packet; and a modification unit that modifies a delay amount field by calculating a modification value based on the second count value, the first count value, and a configuration value of a delay amount field within the time synchronization packet, the configuration value of the delay amount field indicating a total amount of delay in a relay device.

An exemplary aspect of a communication system control method according to the present invention is a control method for a communication system including: a transmission device that transmits a time synchronization packet for time synchronization between opposing devices; and a reception device that receives the time synchronization packet, the control method including: a first counting step of establishing, by the transmission device, synchronization with a second counter within the reception device and measuring, as a first count value, a timing before the time synchronization packet is input to a processing unit that performs processing on the time synchronization packet; a multiplexing step of multiplexing, by the transmission device, the first count value into the time synchronization packet and transmitting the time synchronization packet to the reception device; a second counting step of measuring, by the reception device, a timing when processing by a processing unit that performs processing on the time synchronization packet is completed, as a second count value; an extraction step of extracting, by the reception device, the first count value from the time synchronization packet; and a modification step of modifying, by the reception device, a delay amount field by calculating a modification value based on the second count value, the first count value, and a value of a delay amount field within the time synchronization packet, the value of the delay amount field indicating a total amount of delay in a relay device.

An exemplary aspect of a transmission device according to the present invention is a transmission device that transmits, to a reception device, a time synchronization packet for time synchronization between opposing devices, the transmission device including: a first counter that is synchronized with a second counter within the reception device, and measures, as a first count value, a timing before the time synchronization packet is input to a processing unit that performs processing on the time synchronization packet; and a multiplexing unit that multiplexes the first count value into the time synchronization packet.

An exemplary aspect of a reception device according to the present invention is a reception device that receives, from a transmission device, a time synchronization packet for time synchronization between opposing devices, the reception device including: a second counter that is synchronized with a first counter within the transmission device, and measures, as a second count value, a timing when processing by a processing unit that performs processing on the time synchronization packet is completed; a count extraction unit that extracts a first count value from the time synchronization packet; and a modification unit that modifies a delay amount field by calculating a modification value based on the second count value, the first count value, and a value of a delay amount field within the time synchronization packet, the value of the delay amount field indicating a total amount of delay in a relay device.

Advantageous Effects of Invention

According to the present invention, it is possible to provide a communication system, a communication system control method, a transmission device, and a reception device which are capable of modifying a delay field with a simple configuration.

BRIEF DESCRIPTION OF DRAWINGS

FIG. 8 is a block diagram showing a configuration of the communication system 100 according to a fourth exemplary embodiment of the present invention.

DESCRIPTION OF EMBODIMENTS

First Exemplary Embodiment

Figure 1:
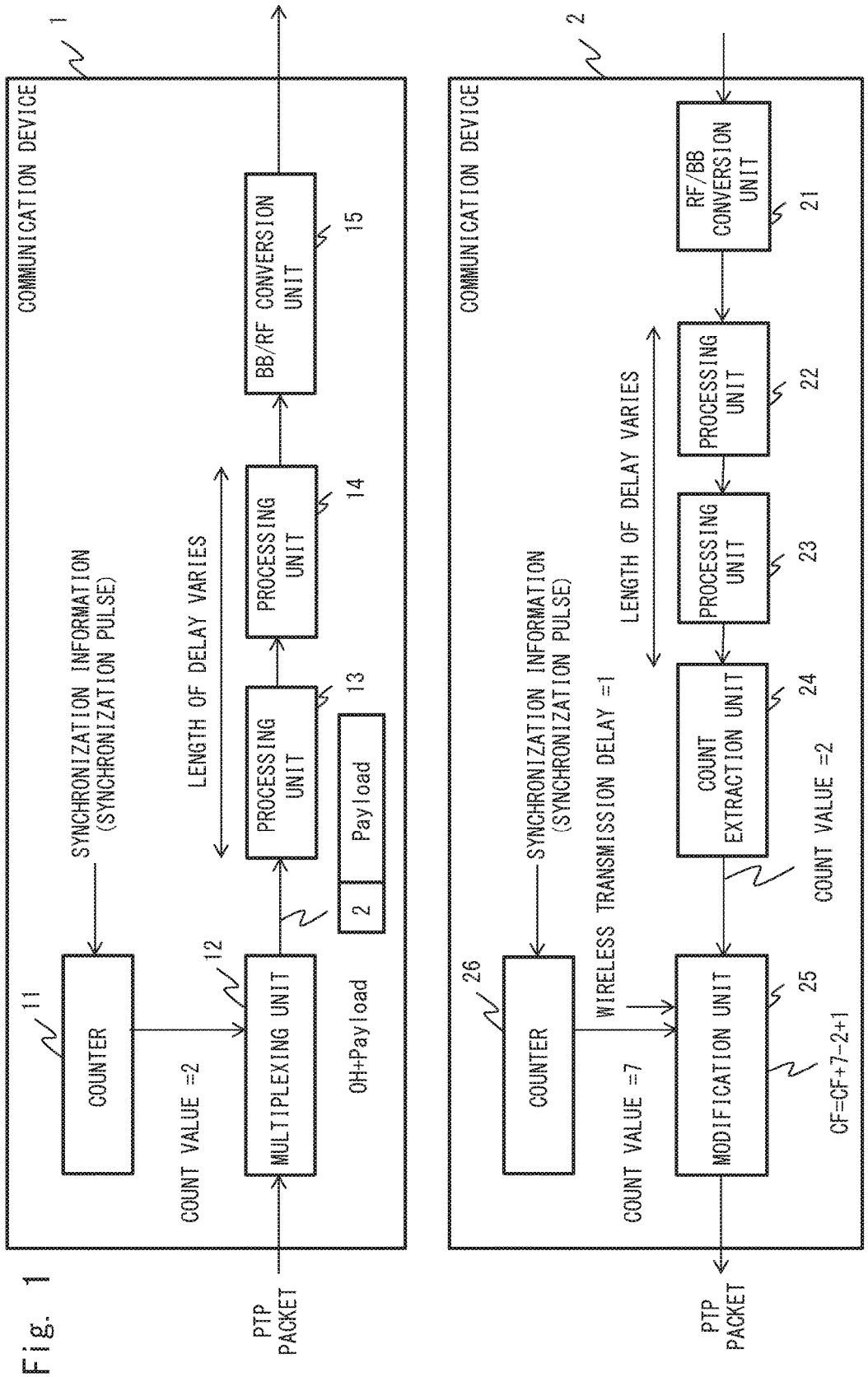
FIG. 1 is a block diagram showing a configuration of a communication system 100 according to a first exemplary embodiment of the present invention.

Exemplary embodiments of the present invention will be described below with reference to the drawings. FIG. 1 is a block diagram showing a configuration of a communication system 100 according to this exemplary embodiment. The communication system 100 includes a communication device 1 and a communication device 2. The communication device 1 and the communication device 2 are devices each having a function of transmitting and receiving various data. For example, the communication device 1 and the communication device 2 are wireless communication devices that connect cellular phone base stations to each other. The communication device 1 and the communication device 2 are not limited to wireless communication devices that connect base stations to each other. Devices that perform wired communication may also be used as the communication devices 1 and 2 as long as they can relay a time synchronization packet. In the following description, assume that the time synchronization packet is a PTP (Precision Time Protocol) packet that conforms to the IEEE 1588 and that the communication device 1 and the communication device 2 perform wireless communication. The operation and configuration of the communication device 1 in which the communication device 1 transmits the PTP packet by wireless communication will be mainly described below. However, the communication device 1 and the communication device 2 can also transmit and receive any other packets and the like as needed.

The communication device 1 includes a counter 11, a multiplexing unit 12, a processing unit 13, a processing unit 14, and a BB-parenthesis-Base Band)/RF-parenthesis-Radio Frequency) conversion unit 15. The communication device 2 includes an RF/BB conversion unit 21, a processing unit 22, a processing unit 23, a count extraction unit 24, a modification unit 25, and a counter 26. The communication device 1 is a transmission terminal that transmits the PTP packet, and the communication device 2 is a reception terminal that receives the PTP packet. Specifically, the communication device 1 receives the PTP packet from another communication device, and transmits the PTP packet so as to relay the PTP packet. Operations of each processing unit in the communication device 1 will now be described.

The counter 11 is a general counter that counts the time. A maximum count value of the counter 11 is set to be sufficiently larger than a delay amount or a communication delay within the communication device 1. The counter 26, which is described later, may have a maximum count value that is different from that of the counter 11, as long as the counter 26 is synchronized with the counter 11. However, it is desirable that the maximum count value of the counter 26 be equal to the maximum count value of the counter 11. This contributes to the establishment of more accurate synchronization. In the following description, assume that the maximum count value of the counter 11 is equal to the maximum count value of the counter 26.

The counter 11 adjusts the count value at a predetermined timing based on a synchronization pulse (described later). Each of the communication devices (the communication device 1 and the communication device 2) detects an overhead of a transmission frame to be described later, and detects a pulse (which is hereinafter referred to as a synchronization pulse) at the timing of detecting the overhead. The concept of detecting the synchronization pulse will be described with reference to FIG. 2.

Figure 2:
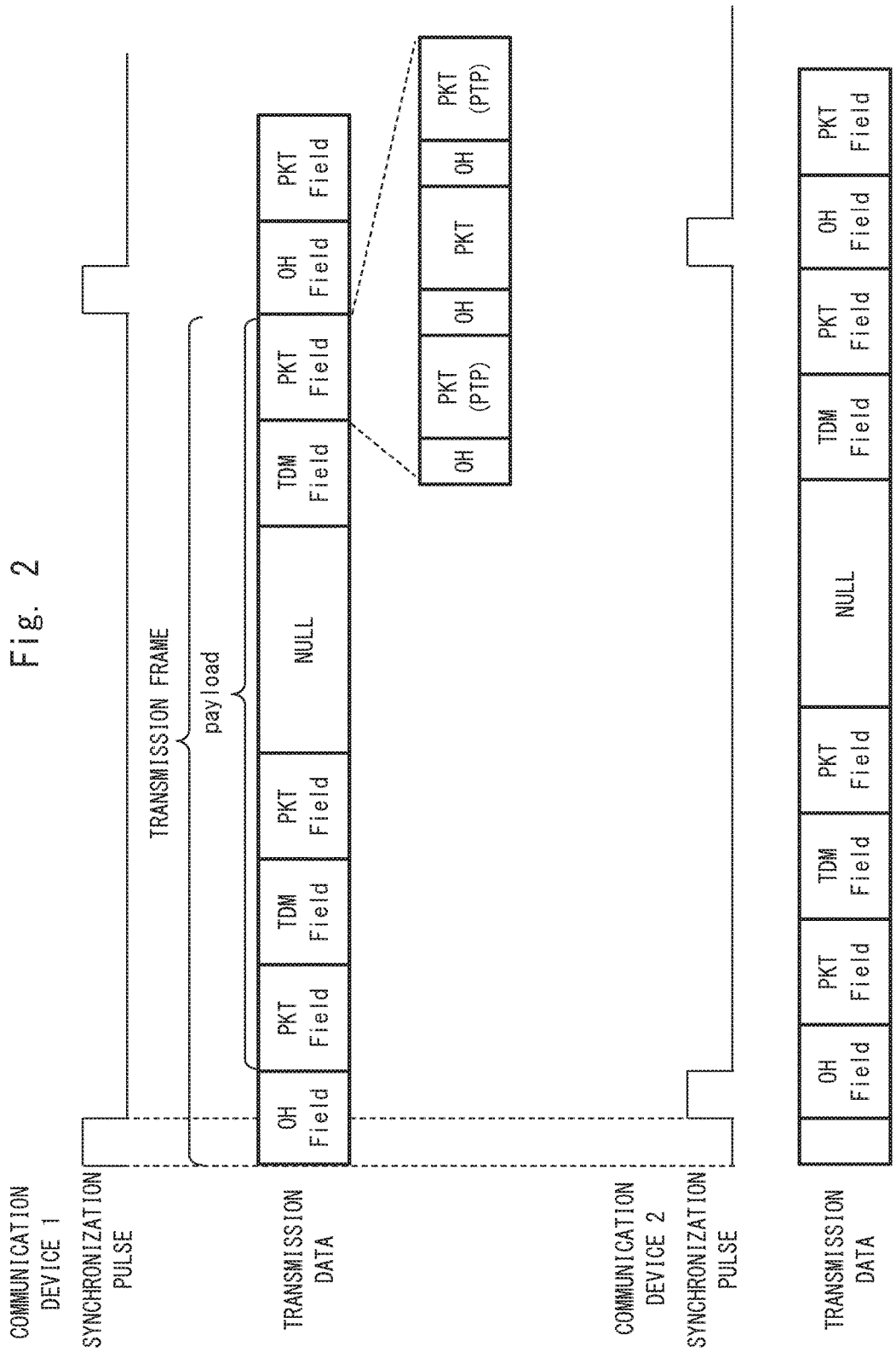
FIG. 2 is a diagram showing the concept of packet synchronization according to the first exemplary embodiment of the present invention.

FIG. 2 is a diagram showing the concept of frame synchronization. Transmission frames are periodically transmitted between the communication devices and received thereby. As illustrated in the figure, each transmission frame is composed of an overhead field (OH field) and a payload, and a plurality of packets (for example, PTP packets) are transmitted in such a manner that the packets are multiplexed into packet fields (PKT fields) within the payload. Each packet is composed of an overhead (OH) and a payload. The overhead refers to various meta-information. Even when there is no data to be transmitted, the communication device 1 and the communication device 2 periodically transmit the transmission frames. When there is no data to be transmitted, part of the payload of each transmission frame to be transmitted is set to NULL.

The communication device 1 and the communication device 2 each include a processing unit (not shown) that detects the synchronization pulse which becomes a high level when the overhead of each transmission frame is detected. Accordingly, the synchronization pulse periodically becomes a high level as shown in FIG. 2.

The counter 11 resets the count value to "0" at the time when the synchronization pulse is input Z (Z is an integer equal to or greater than 1) times. This reset interval is set to be longer than a transmission holding time so as to prevent the counter from being reset during the transmission. Similarly, the counter 26 resets the count value to "0" at the time when the synchronization pulse is input Z times. In this manner, the counters are reset every time the synchronization pulse is input the same number of times, thereby establishing the synchronization between the counter 11 and the counter 26. A communication delay between the communication device 1 and the communication device 2 is adjusted as a fixed delay as described later.

The method of establishing the synchronization between the counter 11 of the communication device 1 and the counter 26 of the communication device 2 is not limited to the above one. For example, when the communication devices transmit and receive a TDM (Time Division Multiplex) signal, the synchronization between the counters may be established in such a manner that the transmission device (communication device 1) embeds synchronization information into the TDM signal to be transmitted and the reception device (communication device 2) adjusts the counter using the embedded synchronization information. However, the synchronization using the timing of detecting the overhead as described above has an advantage in that there is no need for processing such as modification of the overhead.

Referring to FIG. 1 again, the counter 11 monitors the input of the PTP packet which is a packet for time synchronization. The counter 11 notifies the multiplexing unit 12 of the count value before the PTP packet is input to the processing unit 13. The multiplexing unit 12 multiplexes the notified count value into the PTP packet.

The multiplexing unit 12 multiplexes the count value detected by the counter 11 into the overhead of the PTP packet. Specifically, the multiplexing unit 12 embeds the count value at a predetermined position of the overhead of the PTP packet. For example, in the example of FIG. 1, the multiplexing unit 12 writes a count value "2" at the predetermined position of the overhead of the PTP packet.

The processing unit 13 performs processing (for example, modification) on each PTP packet according to data of each PTP packet. The processing unit 14 performs processing in the same manner as in the processing unit 13. The time for processing each PTP packet by the processing unit 13 varies depending on configuration values for the payload and overhead of the PTP packet. In other words, the processing delay time of the processing unit 13 varies. Similarly, the processing delay time of the processing unit 14 varies. While FIG. 1 illustrates two processing units in the communication device 1, the number of processing units is not limited to two. For example, three or more processing units may be provided. In addition, a processing delay time may occur in the BB/RF conversion unit 15 and the RF/BB conversion unit 21. However, also in this case, the communication system 1 can accurately modify the correction field due to the operations of the multiplexing unit 12 and the modification unit 25, regardless of the variation in the processing delay time.

The BB/RF conversion unit 15 transmits, to the communication device 2, the PTP packet on which processing of modification from a BB signal to an RF signal has been performed. The BB/RF conversion unit 15 performs not only modification processing, but also any processing associated with the transmission and reception of transmission frames.

Next, operations of each processing unit in the communication device 2 will be described. The RF/BB conversion unit 21 receives the PTP packet, performs demodulation processing, and supplies the processing unit 22 with the PTP packet on which the demodulation processing has been performed. Further, the RF/BB conversion unit 21 performs any communication processing with the BB/RF conversion unit 15.

The processing unit 22 performs processing (for example, modification) on the PTP packet according to the payload and overhead of each PTP packet. The processing unit 23 performs processing in the same manner as in the processing unit 22. The time for processing each PTP packet by the processing unit 22 varies depending on configuration values for the payload and overhead of the PTP packet. In other words, the processing delay time of the processing unit 22 varies. Similarly, the processing delay time of the processing unit 23 varies. While FIG. 1 illustrates two processing units in the communication device 2, the number of processing units is not limited to two. For example, three or more processing units may be provided.

The communication device 2 detects a synchronization pulse in the same manner as in the communication device 1. This synchronization pulse is used to synchronize the counters of the communication devices 1 and 2. The function of detecting a synchronization pulse is one of the functions of a general communication device that performs frame synchronization. The detected synchronization pulse is input to the counter 26.

The counter 26 adjusts the count value based on the input synchronization pulse. This adjustment is performed at the same timing as the adjustment by the counter 11. This allows the counter 26 and the counter 11 to be synchronized. The counter 26 notifies the modification unit 25 of the count value obtained when the PTP packet is output from the processing unit 23.

The count extraction unit 24 extracts the count value assigned to the overhead of the PTP packet. In the case of FIG. 1, the count extraction unit 24 extracts the count value "2" from the overhead of the PTP packet. The count extraction unit 24 notifies the modification unit 25 of the extracted count value.

The modification unit 25 reads out a value of the correction field from the overhead of the PTP packet. The modification unit 25 performs, on the read value of the correction field, the following operation (Formula (1)) using the count value of the counter 26, the count value extracted by the count extraction unit 24, and a fixed delay value of a wireless transmission delay, and modifies the correction field with the value (modification value) calculated by the operation.

(A configuration value (modification value) set for the correction field by the modification unit 25)=(a correction field value obtained prior to configuration by the modification unit 25)−(a count value extracted by the count extraction unit 24)+(a count value of the counter 26)+(a fixed delay value)     Formula (1)

The term "fixed delay value" of the wireless transmission delay refers to a value indicating a gap between synchronization pulse detection timings of the communication devices. As shown in FIG. 2, there is a gap between the synchronization pulse detection timings. This gap is a fixed time difference that occurs depending on the environment between the communication devices and can be calculated in advance. The adjustment using this fixed delay value enables the establishment of accurate synchronization between the counter 11 and the counter 26.

In the example of FIG. 1, the modification unit 25 performs, on a correction field value "X" transmitted from the communication device 1, an operation using a count value "7" of the counter 26, a fixed delay value "1" of the wireless transmission delay, and an extracted value "2" of the count extraction unit 24, and sets "X+6(X−2+7+1)" in the correction field.

The modification unit 25 transmits the PTP packet, which is obtained after the correction field is configured, to another communication device or the like. When the above-mentioned fixed delay value is negligibly small, the modification unit 25 may modify the correction field using only the count value.

Figure 3:
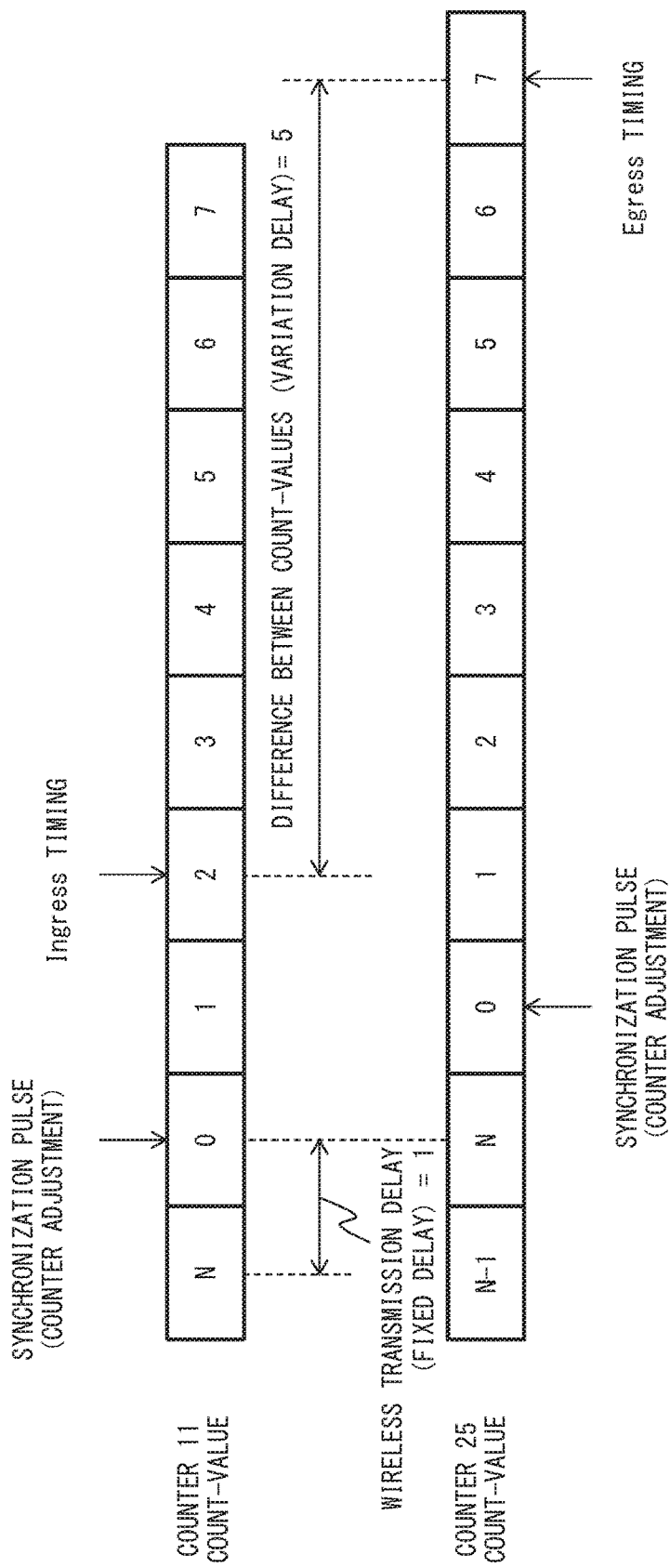
FIG. 3 is a conceptual diagram showing correction field values and a relationship between count values of counters 11 and 26 according to the first exemplary embodiment of the present invention.

Referring next to FIG. 3, the operation of the communication system according to this exemplary embodiment will be described again. FIG. 3 is a conceptual diagram showing correction field values and a relationship between the count values of the counters 11 and 26.

The counter 11 resets the count value to "0" when the synchronization pulse is detected Z times. Similarly, the counter 26 resets the count value to "0" when the synchronization pulse is detected Z times. Thus, when the fixed delay is not taken into account, the counter 11 and the counter 26 are reset simultaneously.

The counter 11 detects, as an Ingress timing, a timing before the processing of the processing unit 13 starts. The subtraction unit 12 assigns the detected count value "2" to the overhead of the PTP packet. The counter 26 detects, as an Egress timing, a timing when the processing of the processing unit 23 is completed. The counter 26 notifies the modification unit 25 of the detected count value "7". The count extraction unit 24 extracts the Ingress timing "2" from the overhead of the PTP packet, and notifies the modification unit 25 of the extracted value "2". The modification unit 25 adds the count value "7" (Egress timing) and the fixed delay value "1" to the correction field value, and modifies the correction field with the value calculated by subtracting the count value "2" (Ingress timing).

Next, advantageous effects of the communication system according to this exemplary embodiment will be described. As described above, the communication device 1 (transmission device) assigns the count value, which indicates a timing before a varying delay occurs, to the overhead of the PTP packet. The communication device 2 (reception device) adds, to the correction field, the count value indicating a timing after the varying delay occurs, and modifies the correction field with the value (modification value) calculated by subtracting the count value assigned to the overhead. In this case, the counter 11 of the communication device 1 and the counter 26 of the communication device 2 are synchronized with each other. Accordingly, as a result of modifying the correction field with the value (modification value) obtained by the above-mentioned operation, the value corresponding to the varying delay in each of the communication device 1 and the communication device 2 is added to the correction field. As shown in FIG. 1, the communication device 1 and the communication device 2 can modify the correction field by using only simple components such as the counters (11 and 26). In other words, the correction field can be configured while the size of the circuit configuration is kept small.

Further, the communication system according to this exemplary embodiment modifies the correction field only twice, i.e., before and after the varying delay occurs, instead of modifying the correction field every time the processing of the processing unit in which the varying delay occurs is completed. Thus, since the correction field is modified only a minimum number of times, deterioration in the accuracy of the correction field due to the modification can be avoided.

Furthermore, the communication system according to this exemplary embodiment modifies the correction field in consideration of the fixed delay that occurs between the communication systems. This makes it possible to configure the correction field with higher accuracy.

Second Exemplary Embodiment

The communication system 100 according to a second exemplary embodiment is characterized by configuring the correction field accurately even when the counters are reset during the transmission of data between communication devices. Differences between the communication system 100 according to this exemplary embodiment and the communication system 100 according to the first exemplary embodiment will be described below.

Figure 5:
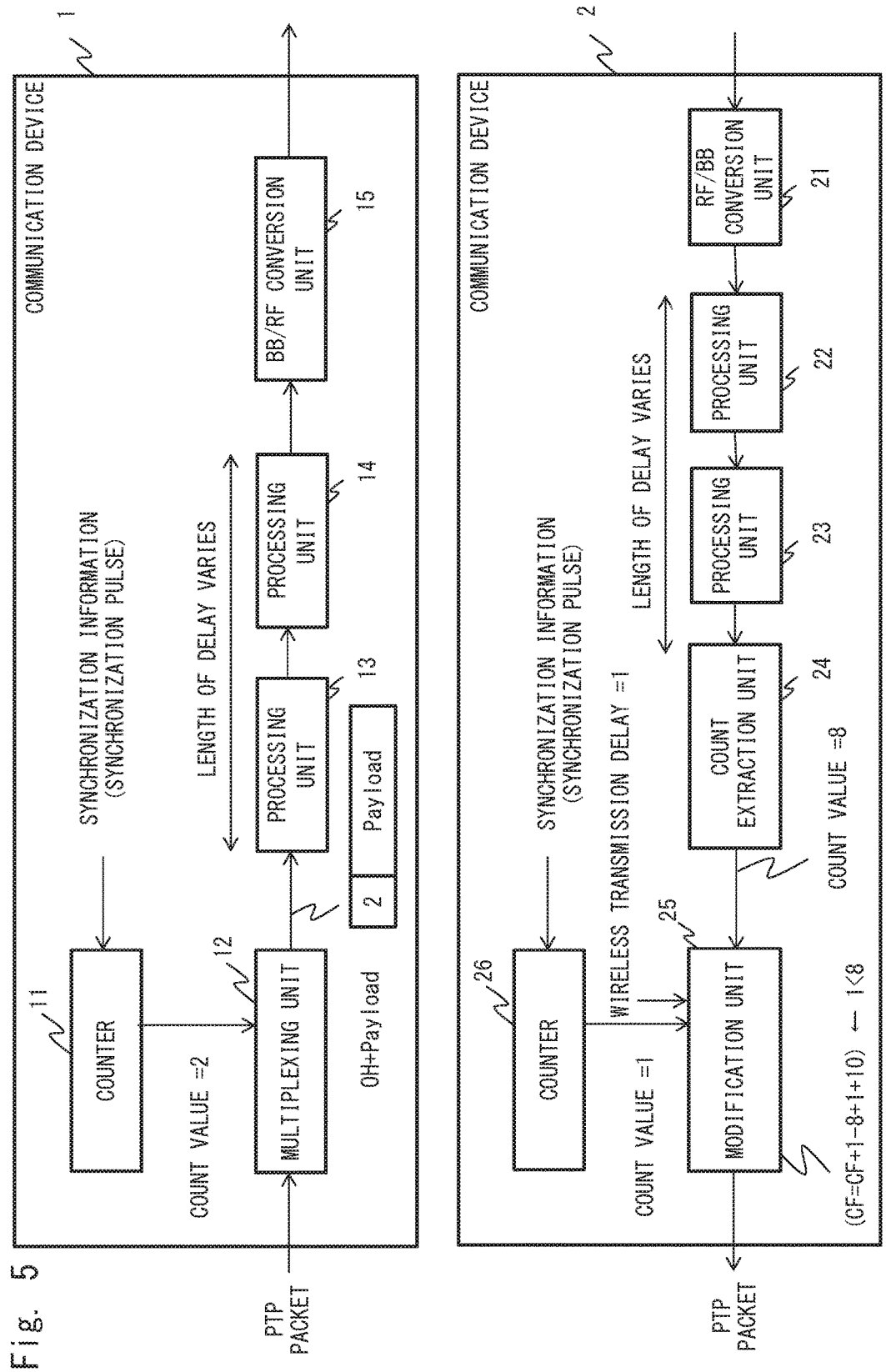
FIG. 5 is a block diagram showing a configuration of the communication system 100 according to a second exemplary embodiment of the present invention.

The configurations of the communication device 1 and the communication device 2 according to this exemplary embodiment as shown in FIG. 5 are basically similar to those of the first exemplary embodiment. In the first exemplary embodiment, a sufficiently large value is set as the maximum count value of the counter 11. In a similar manner, a sufficiently large value is set as the maximum count value of the counter 11 according to this exemplary embodiment.

Also, a sufficiently large value is set as the maximum count value of the counter 26. The processing of the modification unit 25 according to this exemplary embodiment is different from that of the first exemplary embodiment. The details of the processing of the modification unit 25 will be described later.

Figure 4:
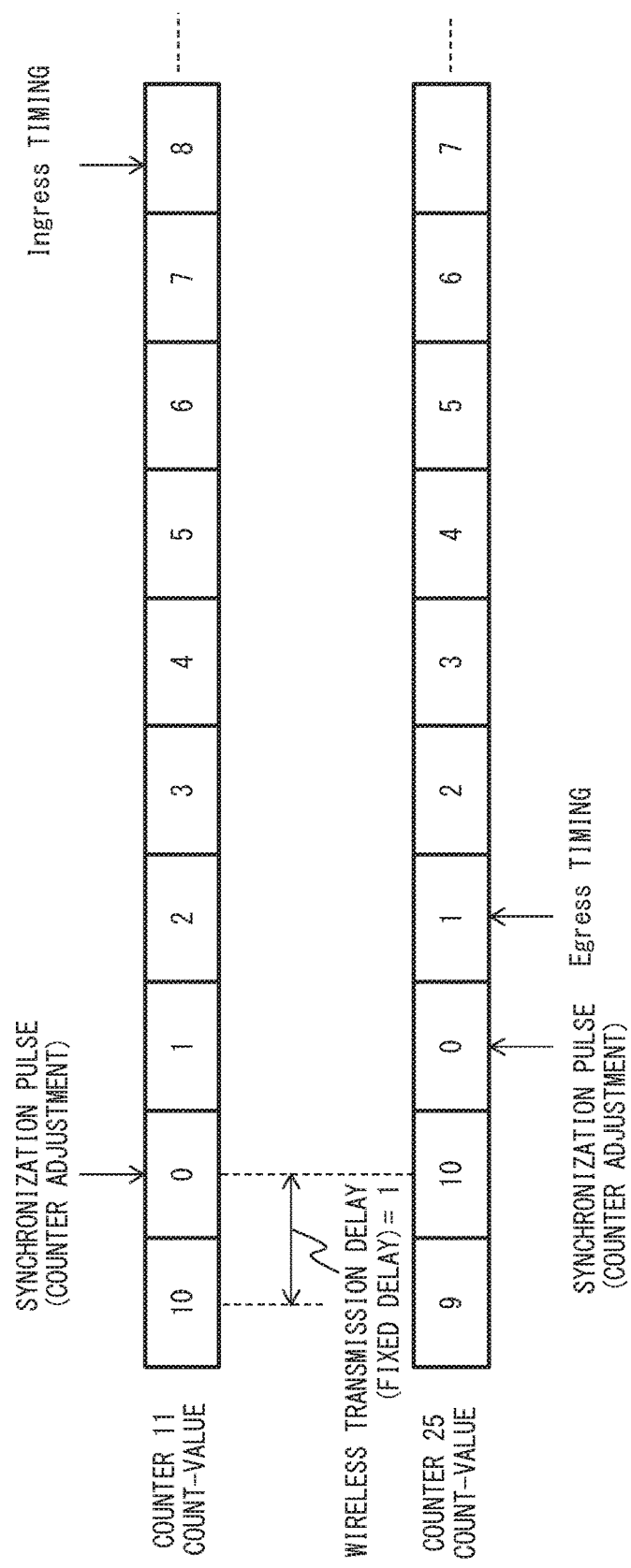
FIG. 4 is a conceptual diagram showing a counting operation of the counter 11 according to the first exemplary embodiment of the present invention.

First, a case where a problem occurs in the configuration of the first exemplary embodiment will be described with reference to FIG. 4. In the following description, assume that the maximum count value of each of the counter 11 and the counter 26 is 10. Also assume that the counter 11 has detected a count value "8" as the Ingress timing of a PTP packet (a timing before the PTP packet is input to the processing unit 13). In this case, when the synchronization pulse is detected a predetermined number of times, i.e., Z times, the counter 11 and the counter 26 are reset to "0". After that, the counter 26 detects a count value "1" as the Egress timing when the processing of the processing unit 22 and the processing unit 23 is completed. In this case, after the modification of the modification unit 25, the correction field indicates "X (the value input from the communication device 1)+1 (the count value of the counter 26)−8 (the count value of the counter 11)+1 (fixed delay)". Thus, the correction field value is smaller than the value input from the communication device 1. In other words, the correction field is configured with a smaller value even though a delay occurs in the processing units (13, 14, 22, and 23). That is, a problem that an accurate value cannot be set in the correction field may occur.

Referring next to FIG. 5, a solution to the above-mentioned problem by the communication system 100 according to this exemplary embodiment will be described. As described above, the counter 11 and the counter 26 are synchronized with each other. The maximum count value of each of the counter 11 and the counter 26 is set to be sufficiently larger than a processing delay or a communication delay which occurs in the communication devices. In the following description, assume that the maximum count value of the counter 11 is equal to the maximum count value of the counter 26.

The modification unit 25 compares the count value of the counter 26 with the count value extracted by the count extraction unit 24 before the correction field is modified. When the count value of the counter 26 is greater than the count value extracted by the count extraction unit 24, the modification unit 25 performs operation processing in the same manner as in the first exemplary embodiment, and modifies the correction field with the value calculated by the operation.

On the other hand, when the count value extracted by the count extraction unit 24 is greater than the count value of the counter 26, the modification unit 25 performs operation processing as shown in the following Formula (2).

(A configuration value (modification value) set for the correction field by the modification unit 25)=(a correction field value obtained prior to configuration by the modification unit 25)−(a count value extracted by the count extraction unit 24)+(a count value of the counter 26)+(a fixed delay value)+(a maximum count length)    Formula (2)

Further, the modification unit 25 modifies the correction field with the value calculated by Formula (2). The other processing of this exemplary embodiment is the same as that of the first exemplary embodiment, and thus the detailed description thereof is omitted.

Next, advantageous effects of the communication system 100 according to this exemplary embodiment will be described. As described above, the modification unit 25 compares the count values to thereby determine whether or not the counters have been reset, and configures the correction field according to the determination result. Thus, even if the counters have been reset, an accurate value can be set in the correction field.

Third Exemplary Embodiment

A communication system according to a third exemplary embodiment is characterized by it being able to reduce a gap between the counters and to configure the correction field with higher accuracy. Differences between the communication system according to this exemplary embodiment and the communication system according to the first exemplary embodiment will be described below.

The configuration of the communication system 100 according to this exemplary embodiment is similar to the configuration shown in FIG. 1. Accordingly, the respective detailed descriptions of processing units are omitted. First, the adjustment of the count value of the counter 11 (or the counter 26) according to the first exemplary embodiment will be described with reference to FIG. 6.

Figure 6:
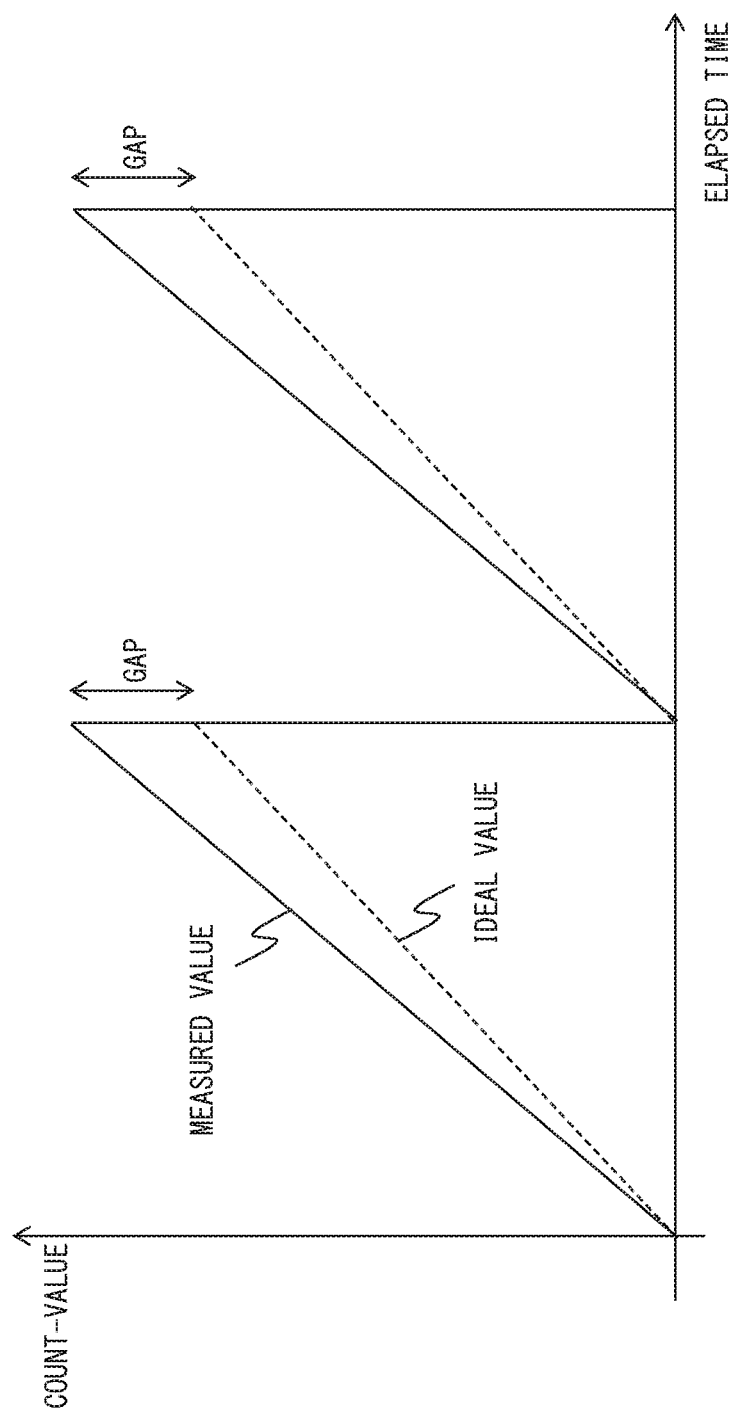
FIG. 6 is a conceptual diagram showing a count value adjustment of the counter 11 (or the counter 26) according to the first exemplary embodiment of the present invention.

In general, the counter 11 performs count processing based on an oscillation signal of an internal oscillating circuit or the like. However, a gap may occur between a count value and an ideal value depending on the operation of the oscillating circuit. For example, as shown in FIG. 6, as the count value increases, the gap between the ideal value and the measured count value increases. The counter 11 (or the counter 26) according to the first exemplary embodiment adjusts the count value (i.e., resets the count value to "0") at a timing when the synchronization pulse is detected a plurality of times. Accordingly, there is a possibility that a predetermined gap may occur as shown in FIG. 6.

The counter 11 and the counter 26 according to this exemplary embodiment adjust the count values every time the synchronization pulse is detected. The concept of this operation will be described with reference to FIG. 7. In the following description, assume that when there is no problem with the oscillating circuit or the like that operates the counter 11, the synchronization pulse is detected every S seconds and the operating frequency of the counter 11 is represented by f.

Figure 7:
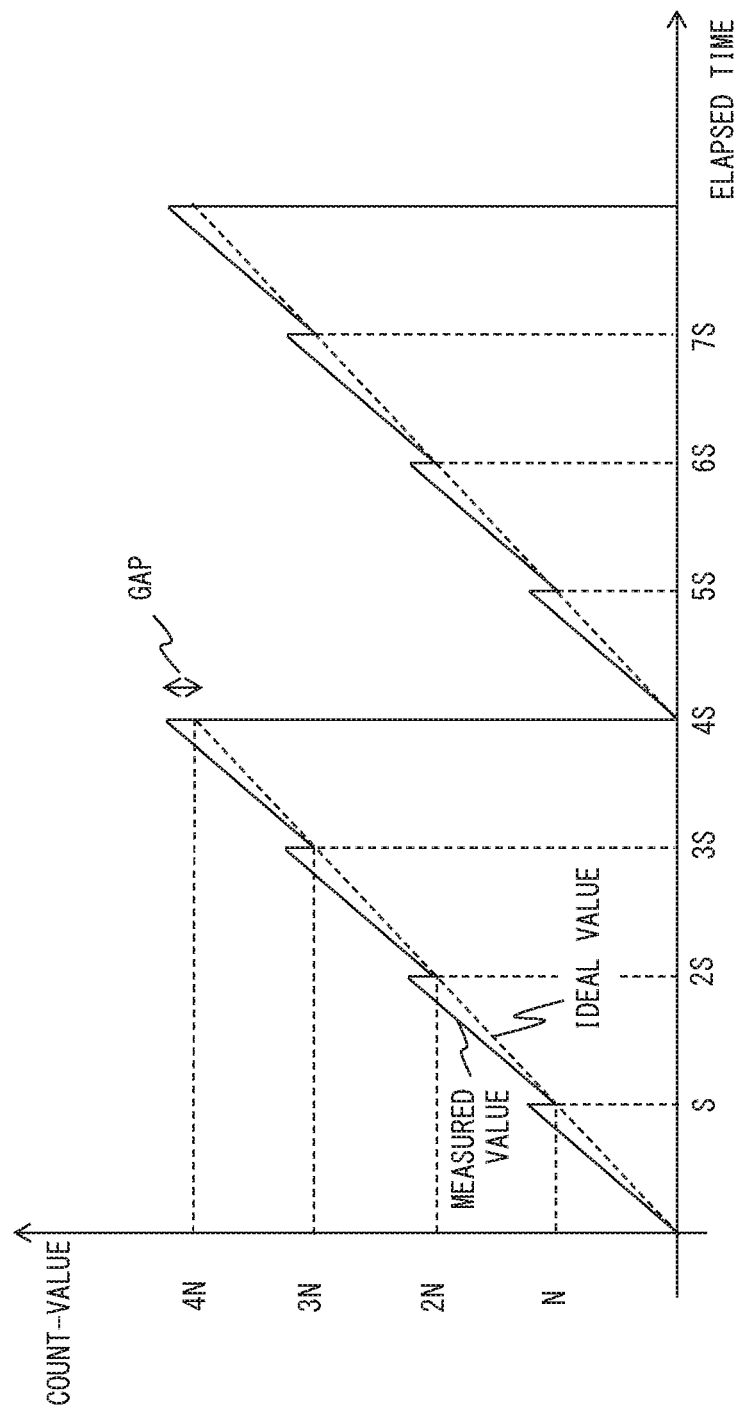
FIG. 7 is a conceptual diagram showing a count value adjustment of the counter 11 (or the counter 26) according to a third exemplary embodiment of the present invention.

In this case, the counter 11 calculates a count value N by multiplying the operating frequency (f) by a synchronization pulse detection period (S seconds). The counter 11 adjusts the count value using the count value N every S seconds. Specifically, the counter 11 adjusts the count value to N after a lapse of S seconds from the start of counting, adjusts the count value to 2N after a lapse of 2S seconds therefrom, and adjusts the count value to 3N after a lapse of 3S seconds therefrom. As illustrated in the figure, the counter 11 adjusts the count value so that the count value is reset at a timing when the count value approaches the maximum count value (about 4N in the example of FIG. 7). In this manner, the count value is adjusted every S seconds as shown in FIG. 7. The count value of the counter 26 is adjusted in the same manner.

As is apparent from a comparison between FIGS. 6 and 7, each of the counter 11 and the counter 26 according to this exemplary embodiment can reduce the gap between the measured value and the ideal value for adjusting the count value for each synchronization pulse, and can improve the accuracy of the count value. The improvement in the accuracy of the count value leads to an improvement in the accuracy of modifying the correction field.

It is most desirable that both the counter 11 and the counter 26 adjust the count value as shown in FIG. 7. However, it is not necessary that both of the counters adjust the count value as shown in FIG. 7. In other words, even when only one of the counters adjusts the count value as shown in FIG. 7, the accuracy of the count value can be improved in comparison to the first exemplary embodiment.

Fourth Exemplary Embodiment

A communication system according to this exemplary embodiment is characterized by configuring the correction field after detecting that there is no difference between the configurations of the communication devices. Differences between the communication system according to this exemplary embodiment and the communication system according to the first exemplary embodiment will be described below.

FIG. 8 shows the configuration of the communication system 100 according to this exemplary embodiment. The configuration of the communication system 100 according to this exemplary embodiment is substantially the same as the configuration shown in FIG. 1. However, the communication system 100 according to this exemplary embodiment transmits configuration information between the communication devices. The term "configuration information" refers to information indicating a configuration in which each communication device operates. The configuration information includes information indicating whether the correction field has been modified or not. Note that the communication device 1 may transmit the configuration information to the communication device 2, or the communication device 2 may transmit the configuration information to the communication device 1. The configuration information may be transmitted at any timing.

A case where the communication device 1 has transmitted, to the communication device 2, the configuration information including information indicating that "the correction field has not been modified" will be described. In this case, if the communication device 2 operates in a configuration in which "the correction field is to be modified", the communication device 2 immediately changes the configuration to a configuration in which the correction field is not to be modified. This prevents the operation from being unstable due to the modification of the correction field in only one of the communication devices. Since the configuration of one of the communication devices may be set to be the same as the configuration of the other one of the communication devices, both of the communication devices may operate in the configuration in which the correction field is to be modified if there is a difference between the configurations of the communication devices.

The present invention has been described above with reference to exemplary embodiments. However, the present invention is not limited to the configurations of the above exemplary embodiments. The present invention includes various changes, modifications, or combinations which can be made to the embodiments by those skilled in the art, without departing from the scope of the claims of the present application, as a matter of course.

This application is based upon and claims the benefit of priority from Japanese patent application No. 2013-127405, filed on Jun. 18, 2013, the disclosure of which is incorporated herein in its entirety by reference.

INDUSTRIAL APPLICABILITY

The present invention is applicable to systems that require time synchronization.

REFERENCE SIGNS LIST

1 COMMUNICATION DEVICE
11 COUNTER
12 SUBTRACTION UNIT
13 PROCESSING UNIT
14 PROCESSING UNIT
15 BB/RF CONVERSION UNIT
2 COMMUNICATION DEVICE
21 RF/BB CONVERSION UNIT
22 PROCESSING UNIT
23 PROCESSING UNIT
24 COUNT EXTRACTION UNIT
25 MODIFICATION UNIT
26 COUNTER
100 COMMUNICATION SYSTEM

The invention claimed is:

1. A communication system comprising:
a transmission device that transmits a time synchronization packet for time synchronization; and
a reception device that receives the time synchronization packet, wherein the transmission device includes:
a first counter that is synchronized with a second counter within the reception device, and measures, as a first count value, a timing before the time synchronization packet is input for performing processing on the time synchronization packet; and
wherein the transmission device multiplexes the first count value into the time synchronization packet; and
the reception device includes:
the second counter that measures, as a second count value, a timing when performing processing on the time synchronization packet is completed;
wherein the reception device extracts the first count value from the time synchronization packet; and
wherein the reception device modifies a delay amount field by calculating a modification value based on the second count value, the first count value, and a value of the delay amount field within the time synchronization packet, the value of the delay amount field indicating a total amount of delay in a relay device, wherein:
when the first count value is greater than the second count value, the reception device modifies the delay amount field by using, as the modification value, a value obtained by subtracting the first count value from the value of the delay amount field and adding the second count value and a maximum count value of the second counter, and
when the second count value is greater than the first count value, the reception device modifies the delay amount field by using, as the modification value, a value obtained by subtracting the first count value from the value of the delay amount field and adding the second count value.

2. The communication system according to claim 1, wherein the reception device modifies the delay amount field by adding a fixed delay value to the modification value, the fixed delay value being generated in communication between the transmission device and the reception device.

3. The communication system according to claim 1, wherein
the reception device and the transmission device periodically transmit and receive a transmission frame which may include the time synchronization packet, and the transmission device adjusts a count value of the first counter based on a timing of detecting an overhead of the transmission frame, and the reception device synchronizes the counters by adjusting the second count value based on the timing of detecting the overhead of the transmission frame.

4. The communication system according to claim 3, wherein the transmission device adjusts a count value of the first counter at each timing of detecting the overhead of the transmission frame by using a multiplication value N obtained by multiplying an operating frequency f of the first counter by an ideal detection period S of the overhead of the transmission frame.

5. The communication system according to claim 3, wherein the reception device adjusts a count value of the second counter at each timing of detecting the overhead of the transmission frame by using a multiplication value N obtained by multiplying an operating frequency f of the second counter by an ideal detection period S of the overhead of the transmission frame.

6. The communication system according to claim 1, wherein
one of the reception device and the transmission device transmits, to the other one of the reception device and the transmission device, configuration information indicating whether the delay amount field is modified or not, and
when there is a difference between a configuration for modifying the delay amount field in the reception device and that in the transmission device, the former configuration is set to be the same as the latter.

7. The communication system according to claim 1, wherein a maximum count value of the first counter is equal to a maximum count value of the second counter.

8. A control method for a communication system, the communication system comprising: a transmission device that transmits a time synchronization packet for time synchronization; and a reception device that receives the time synchronization packet, the control method comprising:
a first counting step of establishing, by the transmission device, synchronization with a second counter within the reception device and measuring, as a first count value, a timing before the time synchronization packet is input to for performing processing on the time synchronization packet;
a multiplexing step of multiplexing, by the transmission device, the first count value into the time synchronization packet and transmitting the time synchronization packet to the reception device;
a second counting step of measuring, by the reception device, a timing when performing processing on the time synchronization packet is completed, as a second count value;
an extraction step of extracting, by the reception device, the first count value from the time synchronization packet; and
a modification step of modifying, by the reception device, a delay amount field by calculating a modification value based on the second count value, the first count value, and a value of the delay amount field within the time synchronization packet, the value of the delay amount field indicating a total amount of delay in a relay device, wherein:
when the first count value is greater than the second count value, the delay amount field is modified by using, as the modification value, a value obtained by subtracting the first count value from the value of the delay amount field and adding the second count value and a maximum count value of the second counter, and
when the second count value is greater than the first count value, the delay amount field is modified by using, as the modification value, a value obtained by subtracting the first count value from the value of the delay amount field and adding the second count value.

9. The control method for a communication system according to claim 8, wherein in the modification step, the delay amount field is modified by adding a fixed delay value to the modification value, the fixed delay value being generated in communication between the transmission device and the reception device.

10. The control method for a communication system according to claim 8, wherein
the reception device and the transmission device periodically transmit and receive a transmission frame which may include the time synchronization packet, and
the transmission device adjusts a count value of a first counter based on a timing of detecting an overhead of the transmission frame, and the reception device synchronizes the counters by adjusting the second count value based on the timing of detecting the overhead of the transmission frame.

11. The control method for a communication system according to claim 10, wherein the transmission device adjusts the count value of the first counter at each timing of detecting the overhead of the transmission frame by using a multiplication value N obtained by multiplying an operating frequency f of the first counter by an ideal detection period S of the overhead of the transmission frame.

12. The control method for a communication system according to claim 10, wherein the reception device adjusts a count value of the second counter at each timing of detecting the overhead of the transmission frame by using a multiplication value N obtained by multiplying an operating frequency f of the second counter by an ideal detection period S of the overhead of the transmission frame.

13. The control method for a communication system according to claim 8, wherein
one of the reception device and the transmission device transmits, to the other one of the reception device and the transmission device, configuration information indicating whether the delay amount field is modified or not, and
when there is a difference between a configuration for modifying the delay amount field in the reception device and that in the transmission device, the former configuration is set to be the same as the latter.

14. A reception device that receives a time synchronization packet for time synchronization, the reception device comprising:
a second counter that measures, as a second count value, a timing when performing processing on the time synchronization packet is completed;
wherein the reception devices is configured to extract a first count value from the time synchronization packet; and
wherein the reception devices is configured to modify a delay amount field by calculating a modification value based on the second count value, the first count value, and a value of the delay amount field within the time synchronization packet, the value of the delay amount field indicating a total amount of delay in a relay device, wherein:
when the first count value is greater than the second count value, the reception device modifies the delay amount field by using, as the modification value, a value obtained by subtracting the first count value from the value of the delay amount field and adding the second count value and a maximum count value of the second counter, and when the second count value is greater than the first count value, the reception device modifies the delay amount field by using, as the modification value, a value obtained by subtracting the first count value from the value of the delay amount field and adding the second count value.

15. The reception device according to claim 14, wherein the reception device modifies the delay amount field by adding a fixed delay value to the modification value, the fixed delay value being generated in communication between the reception device and a transmission device that transmits the time synchronization packet.

16. The reception device according to claim 14, wherein the reception device and a transmission device that transmits the time synchronization packet periodically transmit and receive a transmission frame which may include the time synchronization packet, and the reception device synchronizes the second counter with a first counter by adjusting the second count value based on a timing of detecting an overhead of the transmission frame.

17. The reception device according to claim 16, wherein the reception device adjusts a count value of the second counter at each timing of detecting the overhead of the transmission frame by using a multiplication value N obtained by multiplying an operating frequency f of the second counter by an ideal detection period S of the overhead of the transmission frame.

* * * * *